UNITED STATES PATENT OFFICE.

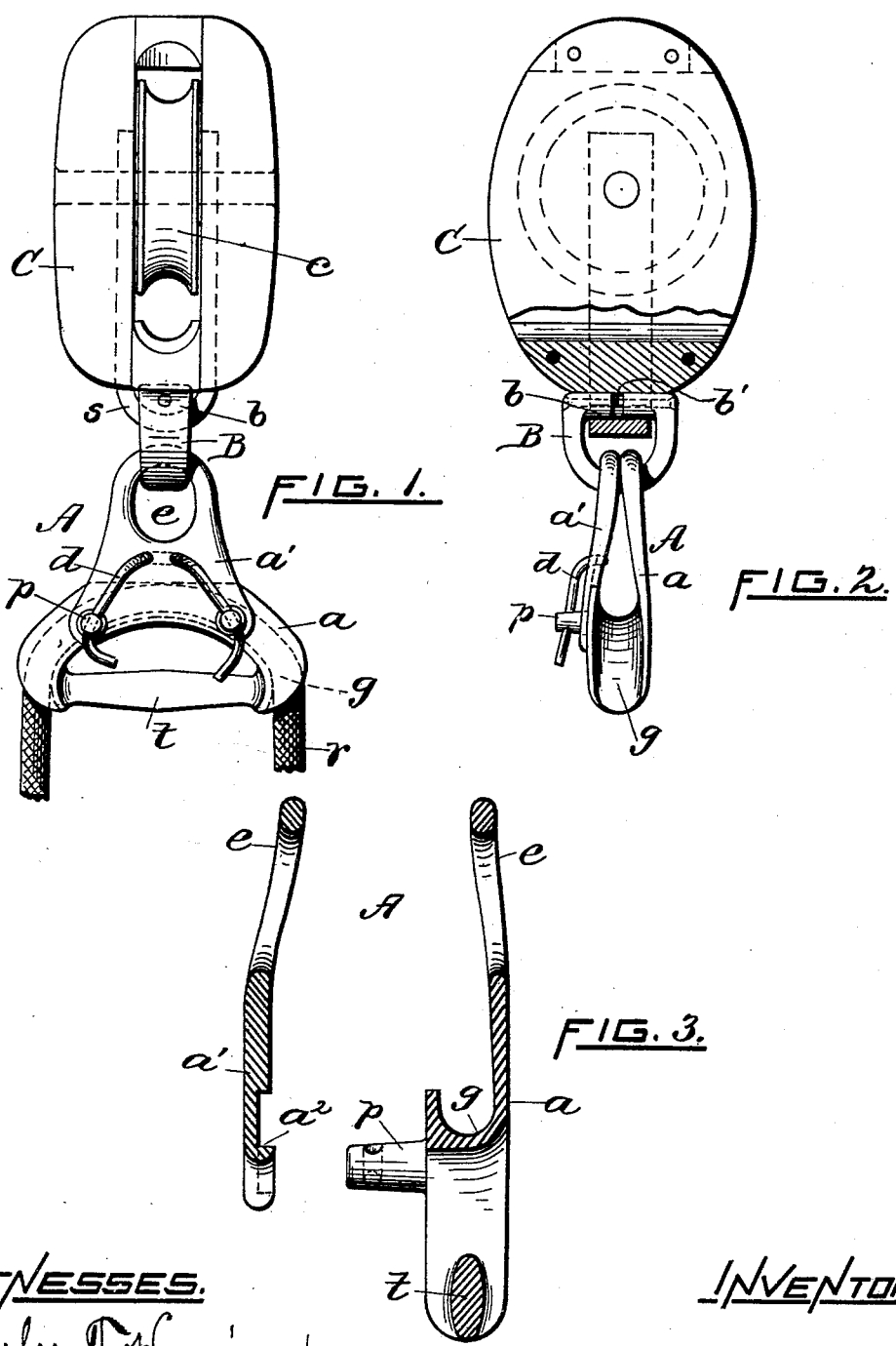

EDWARD J. F. COLEMAN, OF BARRINGTON, RHODE ISLAND.

BRIDLE ATTACHMENT OR MOUSING-HOOK.

SPECIFICATION forming part of Letters Patent No. 653,843, dated July 17, 1900.

Application filed November 23, 1899. Serial No. 738,005. (No model.)

*To all whom it may concern:*

Be it known that I, EDWARD J. F. COLEMAN, a citizen of the United States of America, and a resident of Barrington, county of Bristol, and State of Rhode Island, have invented certain new and useful Improvements in Bridle Attachments or Mousing-Hooks, of which the following is a specification.

My invention relates to improvements in bridle attachments or mousing-hooks, of which the following is a specification.

In devices of the class above referred to it is usual to make the hook separable in the plane of the curved grooved portion which supports the bridle or rope, the hook being unprovided with means for readily handling it, as in hauling down. Sometimes under heavy strains the end portions of the hook become bent or "buckled." In order to overcome the above-named objections, I provide the lower end portion of the bridle attachment with a handle member or connecting-tie, the same being integral with the hook. As thus constructed the handle also imparts increased strength and stiffness to the hook without additional weight, since other portions of the hook may be correspondingly reduced in weight.

I would state here that in furling sails the bridle itself is first removed from the bridle attachment or hook, followed by securing a canvas cover around the boom, gaff, sail, and bridle, and then a rope sling is looped around the whole. The device when provided with my improvement is adapted to be easily drawn down the desired extent by means of the convenient handle formed on the under side of the hook. This lowering of the device is necessary both for overhauling the halyards, &c., and placing it in position to receive the said rope sling. After the latter has been hooked into the attachment the halyards are hauled taut, thereby correspondingly elevating the bridle attachment and relieving the weight of the sail, boom, &c., from the "boom-crotch."

Another feature of the invention resides in providing the upper portion or eye of the hook with a swinging link having its supporting or trunnion ends separated, whereby the link may be inserted into the eye without welding, said ends when in use being in turn supported by the usual block-strap.

In the accompanying drawings, Figure 1 is a front side elevation of a bridle attachment or mousing-hook embodying my improvements. Fig. 2 is a corresponding end view; and Fig. 3 is a transverse sectional view, enlarged, showing the two parts of the hook detached or separated.

In the drawings, A indicates the hook proper, B the swinging link passing through the eye of the hook, and C the block member supported by said link.

The hook A consists of the principal or fixed side $a$, having its lower part enlarged laterally to form a curved grooved seat $g$ for the rope or bridle $r$, the handle $t$, integral with and uniting the two lower end portions of said side $a$, and the separable or detachable side member $a'$. The upper portions of the two sides $a$ $a'$ terminate in the elongated eye $e$. The pins $p$, passing through $a'$, together with the lipped portion $a^2$ of the latter, serve when in use to distribute the weight or pressure borne by the hook. Flexible keepers $d$, passing through holes formed in the outer ends of said pins, serve to maintain the side $a'$ in position. The inner face of the member $a'$ is extended downwardly, so as to form when in use a continuation of the side of the groove $g$ of the other member $a$. (See Fig. 2.)

The link member B may be made of steel or other suitable cast metal. It is substantially U shaped, its two ends being bent inwardly to form trunnions $b$. These latter are well rounded on the under side, so as to snugly fit the adjacent surface of the eye of the block-strap $s$. The trunnion ends are separated from each other by a narrow space $b'$, Fig. 2, thereby adapting the link to be readily passed through the eye of the hook A. If desired, the sides of the link may be subsequently pressed together, thereby practically closing the said opening. In some cases I prefer to drill the link and insert a small tie-rivet, as shown, thereby preventing the link from spreading laterally, the rivet being introduced after the link has been passed through the eye of the hook.

The block C is provided with a freely-turning sheave or pulley and a bent metal strap $s$, passing through the lower end of the block, substantially as usual in fittings of this class. The block is attached to the hook A by means of the connecting-link B, as shown and before described.

The tie $t$, uniting the two ends of the bridle attachment, constitutes a very convenient and efficient handle, by means of which the device can be readily drawn down to remove the bridle or to receive the supporting-sling. The handle further serves as a tie or strut, in that it prevents the ends of the hook from bending or being drawn inwardly when the attachment is subjected to great strains.

I claim as my invention—

1. As an improved article of manufacture, a separable bridle attachment or mousing-hook having the principal or grooved member thereof provided with an integral handle uniting the two lateral ends, thereby both strengthening the hook and forming the handle, for the purpose set forth.

2. The combination with a separable bridle attachment or mousing-hook and a pulley-block, of the link B interposed between and uniting said parts, the link member having inturned open ends $b$, whereby the link is adapted to be passed through the eye of the hook without welding, substantially as described.

Signed by me at Providence, Rhode Island, this 22d day of November, A. D. 1899.

EDWARD J. F. COLEMAN.

Witnesses:
GEO. H. REMINGTON,
CHAS. C. REMINGTON.